United States Patent [19]

Cless et al.

[11] 4,019,676
[45] Apr. 26, 1977

[54] TAPE PUNCH MACHINE
[75] Inventors: Gerhard Cless; Edward L. Kaplan, both of Northbrook, Ill.
[73] Assignee: Extel Corporation, Northbrook, Ill.
[22] Filed: Dec. 8, 1975
[21] Appl. No.: 639,000

Related U.S. Application Data
[62] Division of Ser. No. 485,906, July 5, 1974.
[52] U.S. Cl. .................................. 234/115; 234/130
[51] Int. Cl.² ........................................ G06K 1/10
[58] Field of Search .............. 234/115, 125, 93, 130

[56] References Cited
UNITED STATES PATENTS

| | | | |
|---|---|---|---|
| 2,307,638 | 1/1943 | Philbin et al. ................ | 234/115 X |
| 3,059,844 | 10/1962 | Englund ............................. | 234/115 |
| 3,126,150 | 3/1964 | Lyons et al. ........................ | 234/115 |
| 3,412,932 | 11/1968 | Masterson et al. ................ | 234/115 |

Primary Examiner—Frank T. Yost
Attorney, Agent, or Firm—Kinzer, Plyer, Dorn & McEachran

[57] ABSTRACT

A tape punch machine in which, to assure accurate and reliable tape movement, a stepping motor for feeding the tape receives two pulses for each spacing increment of the tape. The punches are selected by interposers which are not released if the same punch function is to be repeated in successive cycles of the machine.

8 Claims, 13 Drawing Figures

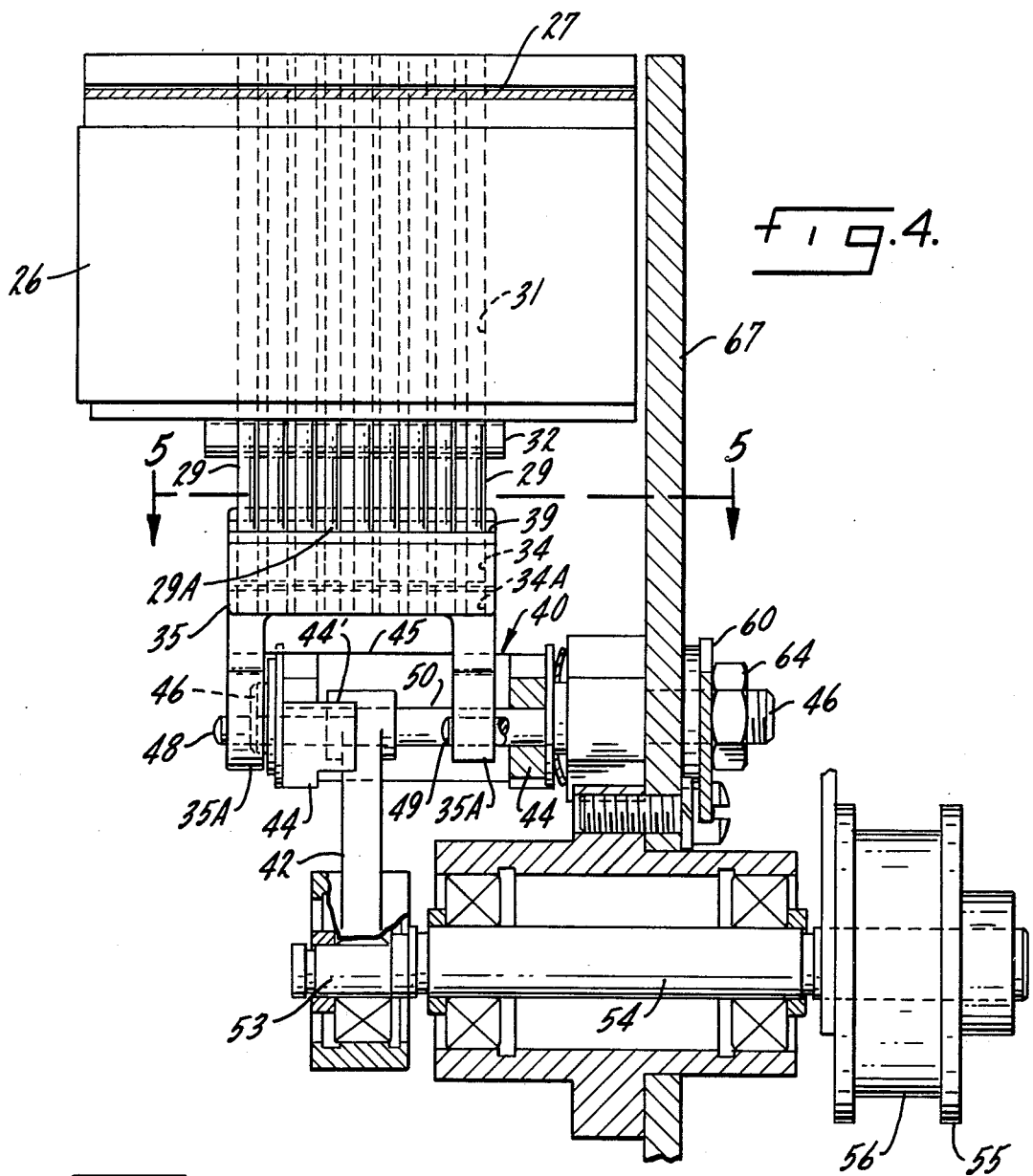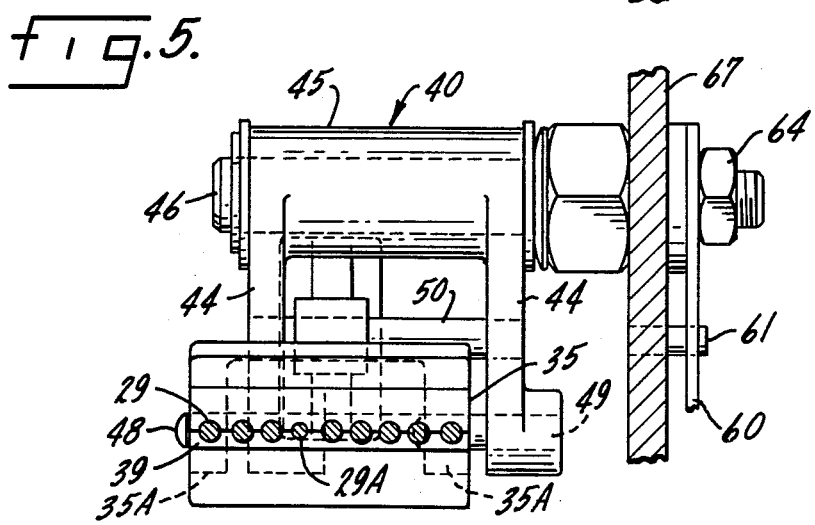

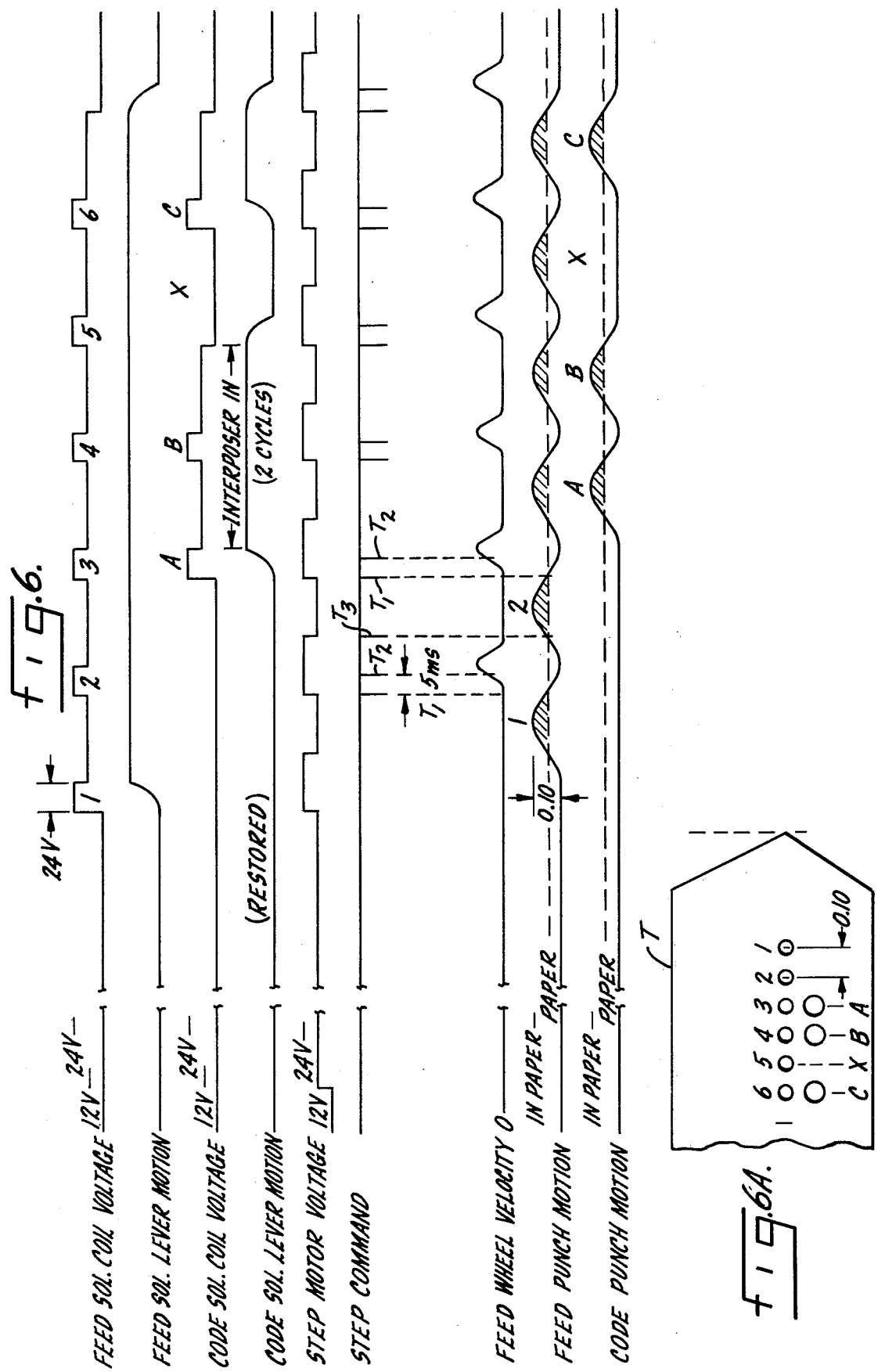

TAPE PUNCH MACHINE

This is a division of application Ser. No. 485,906, filed July 5, 1974.

This invention relates to a cyclically operable tape punch machine in which the punches are selected by interposers in turn actuated by command signals.

A machine of this kind produces a program tape for controlling another machine or for controlling a circuit as in a teleprinter. The holes punched in the tape are small and the spacing between rows of holes is short. Consequently, the components of the machine are tiny and are required to operate within very small space tolerances if there is to be fast response to the command signals for high rate of tape production.

Small movements are involved, as already noted. The tape is advanced by a stepping motor to afford a spacing increment between rows of punched holes. Virtually no tolerance is permissible for the spacing increment. It has been found not infrequently there is a variance in the spacing increment responsible for misfunction when the punched tape is itself later used to control another machine or another circuit. The variance was found due to an oscillation in the stepping motor at the end of the long pulse used to step the motor. An object of the present invention is to eliminate this variance and to obviate oscillation by stepping the stepping motor at least twice to produce the spacing increment in the tape. The particular control used may be employed concurrently in a second mode which has to do with control over the interposers. Under and in accordance with the present invention the interposers, employed as selectors for punch actuation, are operated by solenoids. Operating levers are interposed between the solenoid cores and the related interposers. A certain amount of voltage is required to shift the lever which operates the related interposer, but once this voltage is applied an interposer may be held in its actuated position by a lesser amount of voltage, thereby prolonging the life of the solenoid in an instance where the function of a punch is to be repeated in successive cycles. Accordingly, it is another object of the invention to apply reduced voltage for holding an interposer in actuated position during successive cycles of the machine. A related object is to enable step modulation of the applied solenoid voltage to be effected by the same control means which controls pulses to the stepping motor.

In the drawing:

FIG. 4 is a sectional view on the line 4—4 of FIG. 2;

FIG. 5 is a fragmentary sectional view on the line 5—5 of FIG. 4;

FIG. 6 is a diagram which relates machine functions;

FIG. 6A is a fragment of a tape which may be produced by the machine;

Figure 1:
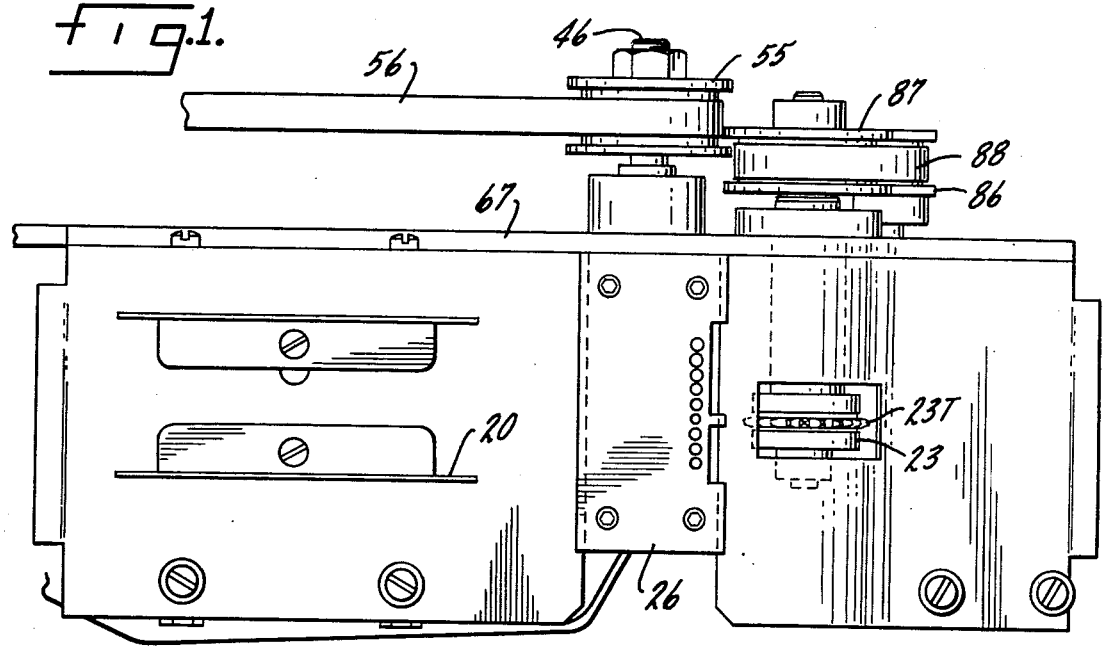
FIG. 1 is a plan view of the machine of the present invention.
Figure 2:
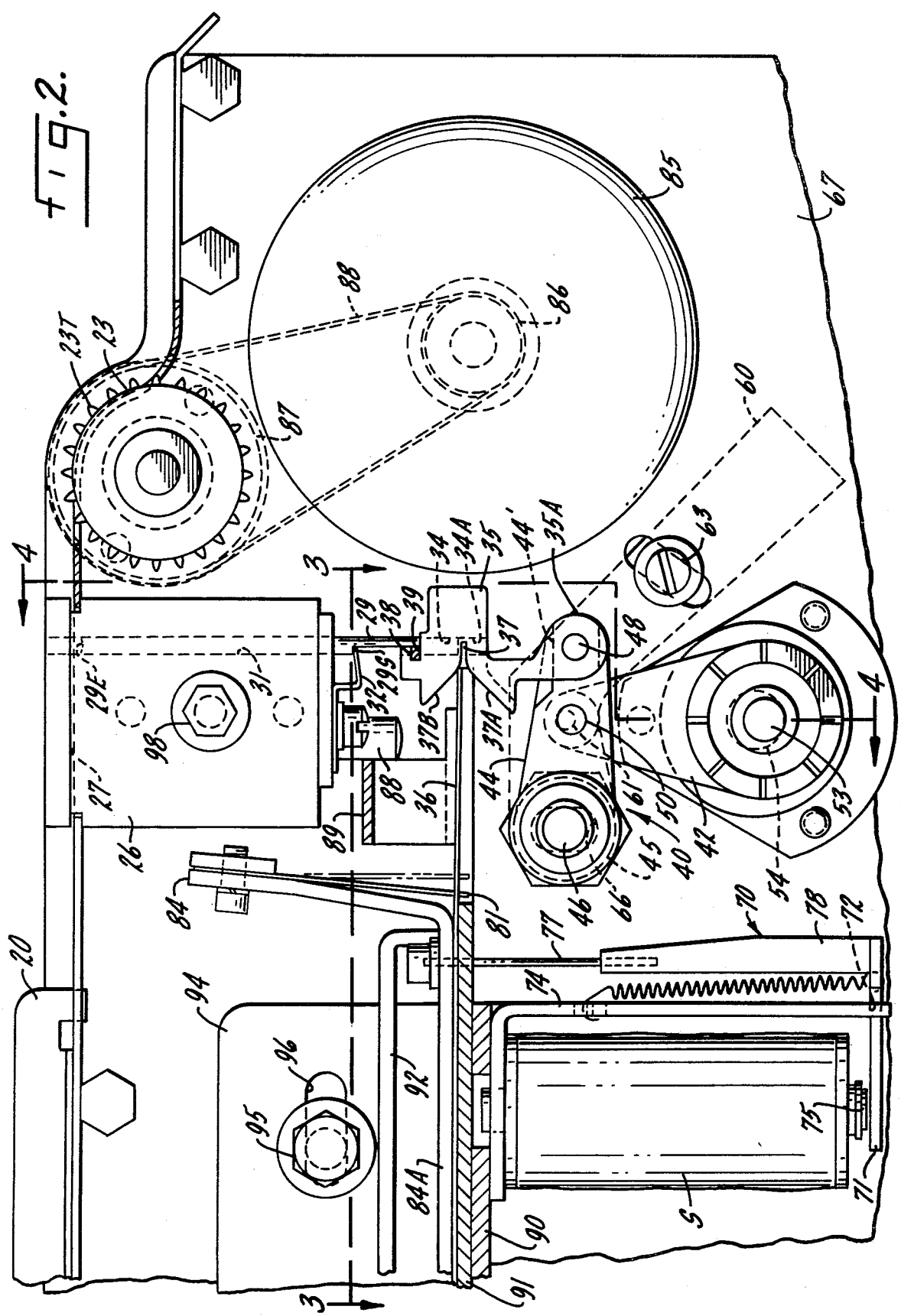
FIG. 2 is a partial sectional view of the machine shown in FIG. 1, on an enlarged scale.
Figure 8:
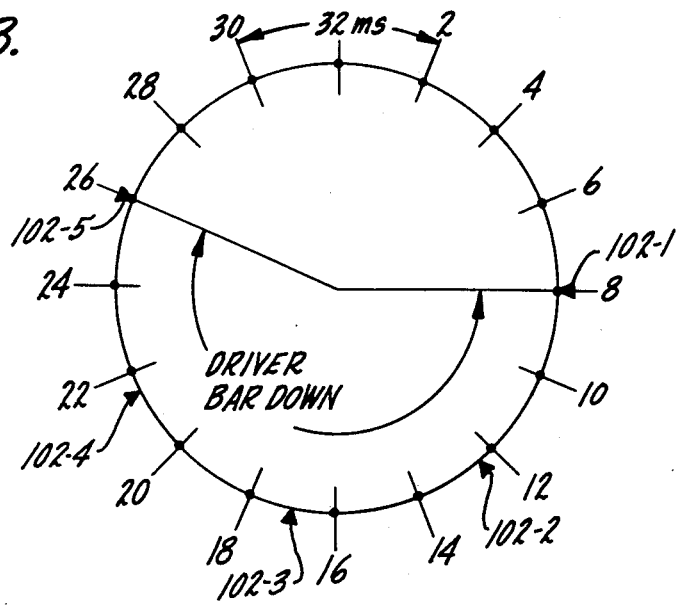
FIG. 8 is a timing diagram.

The tape to be punched is advanced from a supply reel, not shown, through a guide tray 20, FIGS. 1 and 2. To feed the tape, a feed wheel 23 is afforded. The feed wheel has teeth 23T engageable with feed openings in the tape. The feed openings are produced in the tape concurrent with code punching the tape as will be explained.

The tape is punched inside a die block 26 disposed between the guide tray and feed wheel. The tape is fed through a slot 27 in the die block.

To punch the tape, a plurality (nine) of aligned selectively operable punches 29 are mounted for vertical movement in guide openings 31 in the die block. Each punch has a sharp upper end 29E for perforating the tape. To locate the punches in normal position, the shank of each punch is formed with a shoulder 29S engageabe with a stop 32 mounted on the underside of the die block.

To drive the punches, the lower or shank ends of the punches are disposed in apertures 34 of a vertically movable driver bar 35. The punches are selected for operation by thin, flexible, blade-like selectors or interposer slides 36, there being an interposer for each punch.

A separate, intermediate punch 29A, FIG. 4, is active in each cycle to punch a feed opening in the center of the tape.

The driver bar is slotted at 37, affording entry of the free ends of the interposers. The slot intersects the apertures 34 so that each aperture has a portion above and below the slot. The free end of each interposer is normally located at the entry of the slot 37. To guide the interposers into the slot the driver bar is formed with beveled walls 37A and 37B which afford an interposer guide throat divergent outwardly of the slot 37 in the direction of the interposers. No other guide is necessary for assuring entry of the free end of an interposer into the slot 37.

Figure 3:
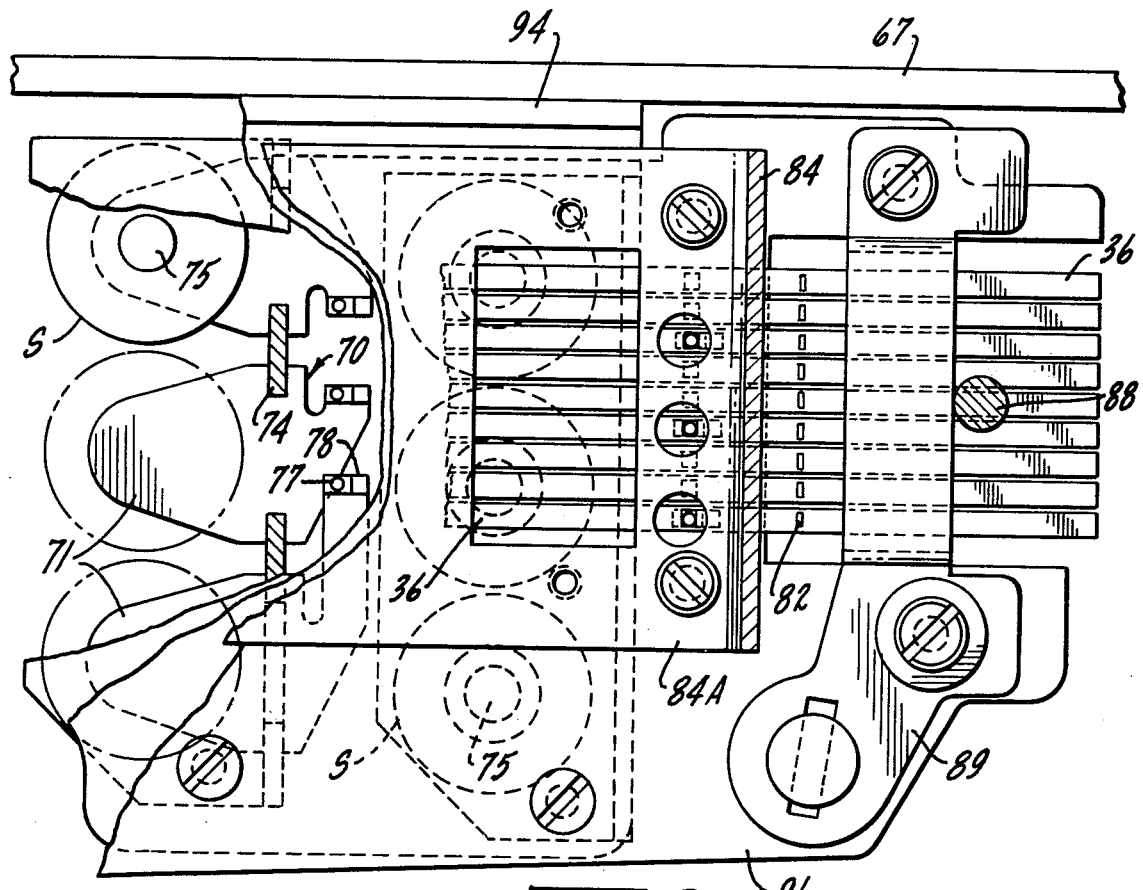
FIG. 3 is a sectional view on the line 3—3 of FIG. 2.

The interposers are controlled by solenoids S, FIG. 3, in a manner to be described in more detail. When a solenoid coil electromagnet is energized by a command signal the free end of the related interposer is extended into slot 37 to engage and support the lower end of a related punch which is thereby selected for operation. Consequently, when the driver bar 35 is elevated the supported, selected punch is actuated to punch the tape. If an interposer or slide remains retracted from slot 37, the lower end of the related punch is not supported; it is idled and experiences lost motion within the lower section 34A of its aperture 34 when the driver bar is raised. To restore an active punch as an incident to restoring (lowering) the driver bar, a punch restoring blade 38 is supported on the driver bar and engages a shoulder 39 on each punch.

The driver bar is operated by a crank assembly including an oscillating link 40 and a drive arm 42 which operates the link. The link 40 is in the form of a yoke, having two fingers 44, FIG. 4, joined by a bail 45. The bail 45 is provided with an aperture enabling the link yoke 40 to oscillate on a support shaft 46, FIGS. 2 and 5, extended therethrough. The driver bar 35 is also of yoke form in that it has two dependent legs 35A. The free ends of the link fingers 44, characterizing the link yoke, are provided with fixed pins 48 and 49 which loosely fit apertures in the legs 35A of the driver bar 35. In this manner the oscillating link and driver bar are loosely yoked to enable the driver bar and die head quickly to be changed in a manner to be explained.

The link 40 is oscillated to reciprocate the driver bar. To do this, the upper end of arm 42 is formed with an opening through which is extended a pin 50 having its opposite ends supported by the link fingers 44, FIG. 5. Arm 42 is oscillated by an eccentric 53 on a shaft 54 driven by a pulley 55, FIG. 4, turned by a belt 56, FIG. 1, in turn driven by an A.C. motor, not shown.

The starting position of the driver bar may be adjusted within a thousandth of an inch by a lever 60, FIG. 2. This adjusts the restored position of the punch element. Lever 60 is supported for pivotal movement on a fixed pin 61, FIG. 5. Lever 60 is clamped against the frame of the machine by a washer and screw 63, FIG. 2, and by a nut 64, FIG. 4, the latter being threaded on the end of shaft 46 which is extended through an elongated slot 66, FIG. 2, formed in the side frame 67 of the machine, allowing adjustment. When parts 63 and 64 are loosened, the lever may be repositioned on support pin 61 as a pivot, raising or lowering the pivot shaft 46. Link 40 then pivots about pin 50. Since link 40 supports the driver bar which in turn supports the punches, the latter are raised or lowered relative to the path of the tape through the die block.

When a solenoid is energized, a lever 70, FIG. 2, is effective to thrust the related interposer into the slot of the driver bar. The lever 70 is L-shaped and has one leg 71 pivotally supported on an edge 72 formed in a solenoid mounting bracket 74. Leg 71 is of magnetic material and is presented to the core or armature 75 of the solenoid.

A pin 77 is supported by the other leg 78 of the lever 70. The pin fits an opening in the related selector or interposer 36.

There is, of course, a solenoid S and related lever assembly 70 for each interposer. When a solenoid is energized, its lever 70 pivots clockwise, FIG. 2, thrusting the related interposer 36 into the slot of the driver bar 35. The throat 37A-37B serves as a guide, assuring the actuated interposer is presented to the punch to be selected.

A leaf spring 81, FIG. 2, restores an activated interposer and its supporting slide. The free end of the leaf spring fits an opening 82, FIG. 3, in the interposer while the opposite end is secured to a support post 84. The spring is under tension as long as the interposer is in an actuated position and is effective to restore the actuated parts when the related solenoid is de-energized.

The wheel for advancing the tape is turned by a stepping motor 85, FIG. 2, which drives a sprocket 86. The shaft of the tape drive wheel is provided with a sprocket 87. A timing belt 8 connects these two sprockets.

It has been mentioned the restored position of the punches may be adjusted by lever 60. The idle or restored position of the interposer slides 36 may also be accurately adjusted by means of a fixed stop 88 at the underside of the die block 26 and an adjustable stop 89 which is supported in a manner to be described.

In this connection it will first be noted the solenoid brackets 74, FIG. 2, are secured as part of a solenoid sub-assembly to a mounting plate 90 in turn fastened to the underside of a support plate 91. The interposers slide on the top of plate 91. The spring support member 84 includes a plate extension 84A overlying the interposer slides so that the interposers are sandwiched between plates 91 and 84A. The interposer guides are essentially the springs 81 and pins 77. A detachable cover 92 protects the interposers.

A vertical flange 94 is integral with plate 90, affording a mounting bracket fastened by hex head screws as 95 to the inside face of the side frame 67 as shown in FIG. 2. Only one of the fastening screws 95 is shown. The flange 94 is slotted at 96 to receive the fastening screws which, when loosened, permit the mounting bracket 90-94 to be shifted fore and aft, shifting the interposers at the same time.

Figure 1A:
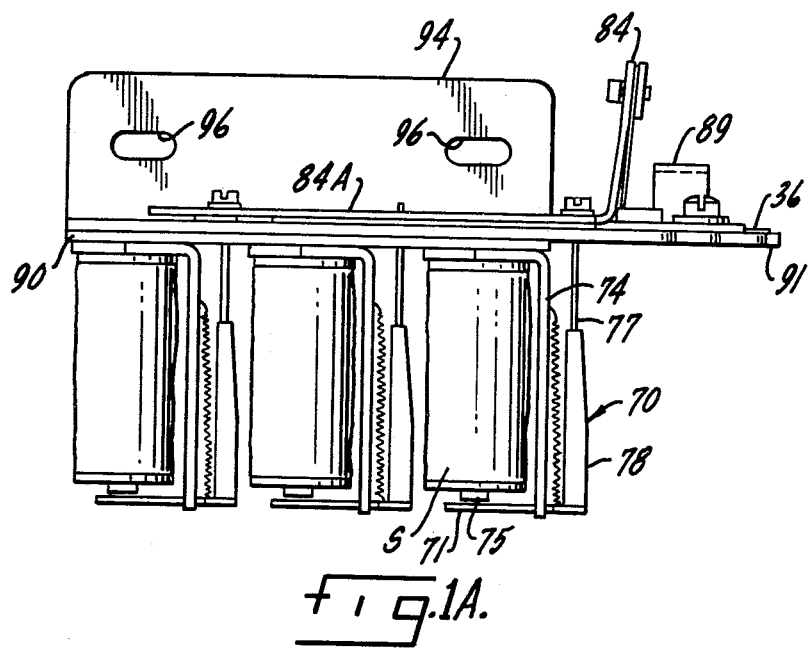
FIG. 1A is an elevation of a sub-assembly of the machine.

As mentioned, the means for adjusting the restored position of the interposers includes a fixed stop 88 and an adjustable stop 89. The latter is in the form of a bail or strap, FIGS. 2 and 3, supported on the upper side of plate 91 for adjusting movement toward or away from stop 88. This adjustment is made at the time of factory assembly. Afterwards the sub-assembly (solenoid, interposers and levers 70) supported by bracket plate 90-94 is positioned on the side frame, slid forward until stop 89 is against stop 88 and then the securing screws as 95 are tightened. This sub-assembly, detached, is shown in FIG. 1A.

Thus, the pre-set position of the stop means 89 locates the selector ends of the interposers in the throat of the driver bar, spaced by that distance from the shank ends of the punches which will be most responsive for selecting the punches in accordance with the timing characteristics of each machine.

This arrangement also enables the punches and die block to be changed, as for instance when the punch diameter is to be changed or when there is to be an alteration in the location or size of the punch 29A which provides the feed openings in the tape. Thus, by loosening the screws as 95, the support bracket 90-94 may be shifted to the left, FIG. 2, affording access to the driver bar 35. The driver bar, it will be recalled, is supported on two pins 48 and 49, FIGS. 4 and 5, fixed to the link fingers 44. This is a loose support, that is, the pins 48 and 49 only loosely (slidably) fit the openings in the legs 35A of the driver bar. Also, the driver bar and die block are joined by the stop 32.

Consequently, when plate 91 and the interposers are shifted to clear the left side of the driver bar, FIG. 2, and after removing a screw 98 which secures the die block in operative position on the side frame 67, the die block and driver bar may be extracted as one unit merely by sliding the legs 35A of the driver bar off the pins 48 and 49, to the left as viewed in FIG. 4. By removing stops 32 and 39, the punches may be extracted. Repositioning is in the opposite direction, the driver bar legs being slipped on to the pins. In this connection it will be noted, FIG. 4, the right leg 35A of the driver bar is shorter than the left, and the left finger 44 of the link 40 is flattened at 44' to facilitate extraction and slip fit insertion of the die block-driver bar sub-assembly.

In operation, shaft 54 is constantly driven, which means the driver bar is constantly reciprocated but no punch is active unless its solenoid is energized. These and other operating and functional characteristics of the machine are shown in FIGS. 6 and 6A.

The leading end of a tape T in the course of movement through the machine is shown in FIG. 6A. Machine functions are diagrammed in FIG. 6.

As already noted, punch 29A, FIG. 4, once the tape is threaded onto the feed wheel, is constantly active in successive cycles, which means its solenoid is constantly active. Referring to FIG. 6, the feed punch motion is shown as a sine curve (in and out of the paper) which characterizes the successive, constant cycles of the driver bar. Total movement of the driver bar from bottom dead center to top dead center is only about 0.120 inch, the punch travel being slightly less. The code punches, when actuated, undergo the same motion, FIG. 6.

Further in connection with FIG. 6A, it is assumed that one of the code punches is actuated in two successive cycles (A, B), that this same punch is idled in the following cycle (space X on the tape) and that the same code punch is actuated in the next cycle, punched hole C, FIG. 6A.

Since the tape will be undergoing feeding movement before the punch command signals are originated, two feed hole punches (1, 2) are shown in the tape in advance of the first code hole, A.

The feed wheel 23 is stepped by motor 85. The feed tape can only be advanced when the punches are withdrawn from the paper. Consequently, as shown in FIG. 6, motor 85 is stepped only during the 180° period which intervenes between the time the punches are withdrawn from the tape and their next entry into the tape. We have found that with the increment of tape advance involved between rows of holes (a spacing increment of only one-tenth of an inch) the inherent tendency for the stepping motor to oscillate at times produces an uncertain and inaccurate end point of tape movement when a single stepping pulse is used, whereas this oscillation can be dampened and for all practical purposes removed, resulting in accurate and predictable tape positioning, by applying two stepping pulses to motor 85 for each increment (0.1 inch) of tape spacing movement.

Applying two stepping pulses to the stepping motor must, of course, be timed accurately to punch movement.

Figure 7:
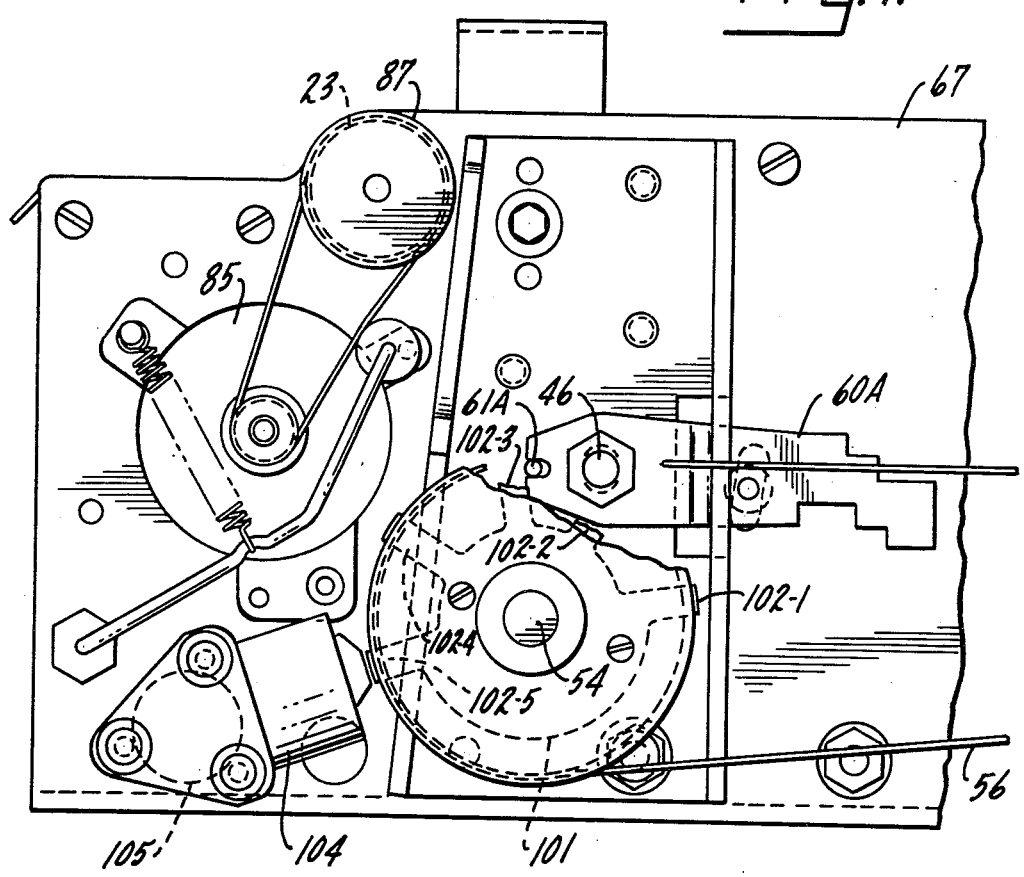
FIG. 7 is a view at the back of the machine and showing an adjusting lever of modified form.

In accordance with the present invention this is accomplished by switch means timed and controlled by shaft 54, enabling the voltage applied to the stepping motor to be varied. Referring to FIG. 7 a plurality of steel slugs are mounted on a disc 101 in turn secured to shaft 54 for rotation therewith. In FIG. 7 the slugs are shown as five in number, arbitrarily identified as 102-1 through 102-5.

The slugs rotate past a coil 104 and an associated permanent magnet 105 which sets up a field with a certain flux density. As a slug moves past the coil 104, the magnetic flux density changes because the reluctance of the magnetic circuit changes, and accordingly an enabling signal is generated much in the manner of a switch operated by a timing cam on shaft 54. While the sequence of the timing slugs may be changed from what is given hereinafter, it may be assumed for purposes of disclosure that switching slug 102-1 generates a control signal to switch from 12 volts to 24 volts, slug 102-3 generates a control signal to switch from 24 volts to 12 volts, and the fifth slug 102-5 results in generation of a control signal enabling the voltage to be dropped from 12 volts to zero. The voltage referred to is the voltage source (not shown) employed to operate the stepping motor and to operate the interposer solenoids.

The magnetic circuit for applying accurately timed voltage changes may also be used to control operation of the interposer solenoids. Inasmuch as the feed punch 29A is always active and inasmuch as any one of the code punches may be active in successive cycles when the tape is being punched, as shown in FIG. 6A, it becomes advantageous to hold the interposers in actuated position when it is determined that the function of a punch is to be repeated in successive signals. This conserves the solenoid. The sensing means for determining a succession of punch function is not shown and plays no part in the present invention. It may be simply noted a sensing means is employed to determine in advance if a punch active in a previous cycle is to be active in the next succeeding cycle, and of course this is constantly true of the punch for creating the tape advance holes.

It is assumed the voltage source (24 volts) imposed on a solenoid coil is required to operate the related lever 70 from a completely restored or idle position clockwise to the position where it drives the related interposer into the driver bar slot but considerably less voltage (twelve volts) is required to maintain that same lever and its interposer in punch selecting position.

Again, since the reference frame for all timing of machine functions is identified with shaft 54, the slugs on disc 101 may be used to step-modulate the voltage for the solenoids S between operating voltage, holding voltage and drop-out (zero) voltage. This is shown in FIG. 6. The voltage for the code punching solenoids may vary between zero, 12 and 24. Twenty-four volts is required to move an interposer from restored to punch selector position, whereas only 12 volts is required to hold the interposer there. Consequently, the same timing slugs used to pulse the stepping motor may be employed to step-modulate the voltage applied to the solenoid coils as will be evident from FIG. 6.

A modified form of lever for adjusting the punch stroke is shown in FIG. 7, lever 60A; its pivot is at 61A.

Figure 9:
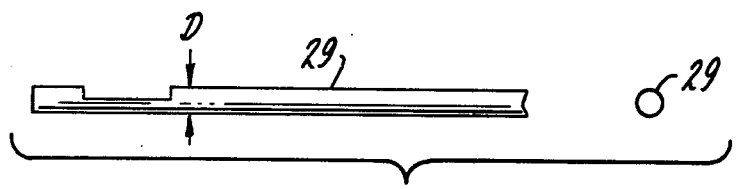
FIGS. 9, 9A and 9B show punch configurations.
Figure 9A:
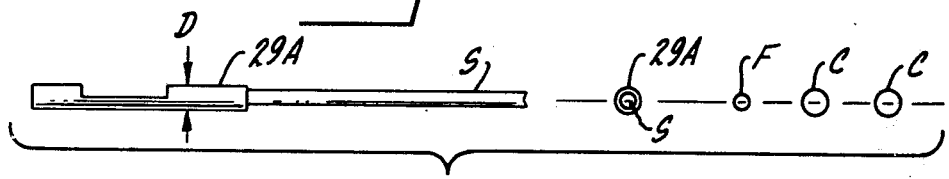
Figure 9B:
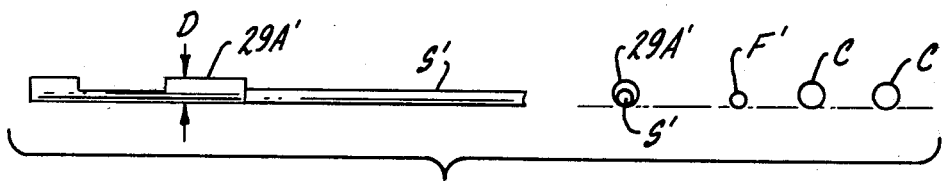

As shown in FIG. 6A the openings punched for advancing the tape are of considerably smaller diameter than the so-called code holes, serving as a distinction in appearance. In FIGS. 9, 9A and 9B more detail is presented. The feed hole F, FIG. 9A, may be centered on the code holes C and consequently the stem S of punch 29A which presents the punch end is centered with respect to the shank. The shank has a diameter D, the same as the diameter of the typical code hole punch 29, FIG. 9.

However, a requirement is sometimes that the feed opening punched in the tape be of the so-called advanced feed hole orientation. This is shown in FIG. 9B where the feed hole F' is in tangent position compared to the code holes C. Any change in this regard in the machine is easily accomplished under the present invention simply by changing the die block to accommodate a modified punch 29A', FIG. 9B, in which the stem S' is off-set to one side of the shank diameter D. The two punches, 29A and 29A' are therefore supplied as a set, permitting interchange in the die block.

We claim:

1. In a cyclically operable tape punch machine, punches selectable for operation, means to operate the selected punches, interposer slides moveable between a retracted and actuated position for selecting the punches, means including an electromagnetic means operable by an operating voltage of predetermined value to move an interposer from restored to actuated position in a cycle of the machine when its punch is to be operated and means to apply a reduced holding voltage to the electromagnetic means merely to hold an interposer in actuated position when that interposer is to be active in a cycle following the cycle in which it was actuated.

2. A machine according to claim 1 having a stepping motor for advancing a tape past the punches and through a spacing increment of tape movement between successive punched holes in the tape and means for applying at least two pulses to the stepping motor for each increment of tape movement.

3. A machine acording to claim 1 in which punch motion is derived from a rotary shaft, a disc on said shaft, steel slugs in circumferential displaced relation on said disc, a coil and associated magnet adjacent the path of said discs cooperating with selected of said steel slug to generate control signals for switching the voltage applied to the electromagnetic means amongst zero voltage, operating voltage and holding voltage.

4. A machine acccording to claim 3 having a stepping motor for advancing a tape past the punches and through a spacing increment of tape movement between successive punched holes in the tape and means for applying at least two pulses to the stepping motor for each increment of tape movement.

5. A machine according to claim 4 wherein selected of said slugs cooperate with said coil and magnet to generate signals for so pulsing the stepping motor.

6. A cyclically operable tape punch machine for punching a tape in accordance with command signals and comprising:
   a plurality of punch elements arranged in a die block for advancing and restoring movement;
   a reciprocal driver bar having apertures receiving the shanks of the punch elements, said driver bar having a slot intersecting said apertures, said punch elements being supported to have the shank ends thereof exposed to the slot;
   interposers movable from a restored to an actuated position for selecting the punch elements and having the selector ends thereof disposed at the entry to said slot in the restored position;
   voltage-response interposer actuating means for actuating the interposers to move the end of an actuated interposer into the slot to support a punch element for movement with the driver bar;
   and interposer control means, included in the interposer actuating means, applying a holding voltage for maintaining each interposer that has been actuated during one cycle of the machine in its actuated position through the next cycle whenever its function is to be repeated in said next cycle.

7. A machine according to claim 6 in which the interposer actuating means includes a plurality of solenoids, one for actuating each interposer, and in which the interposer control means applies a given operating voltage to each solenoid to actuate its interposer from restored to actuated position and thereafter applies a substantially smaller voltage to that solenoid to hold such interposer in its actuated position.

8. A machine according to claim 6, further comprising a stepper motor for advancing the tape through a spacing increment between successive punched holes in the tape, and motor actuation means for applying at least two signal pulses to the stepping motor for each increment of tape movement.

* * * * *